2,938,697

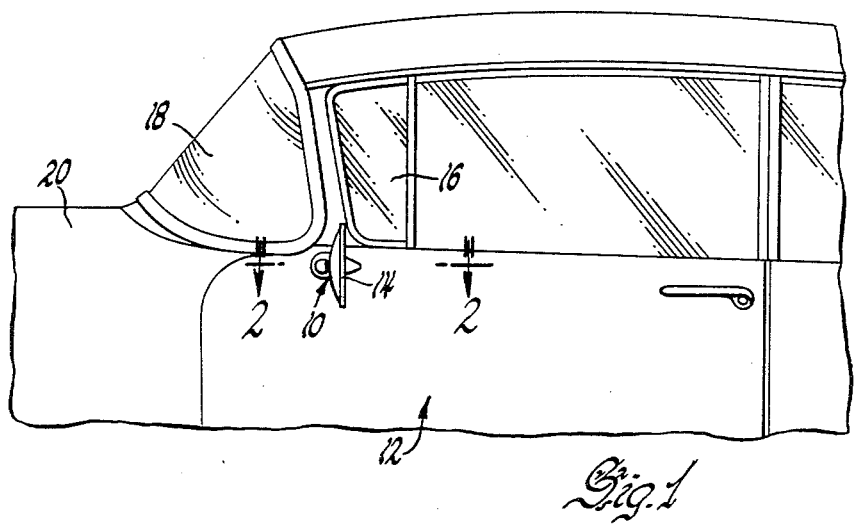
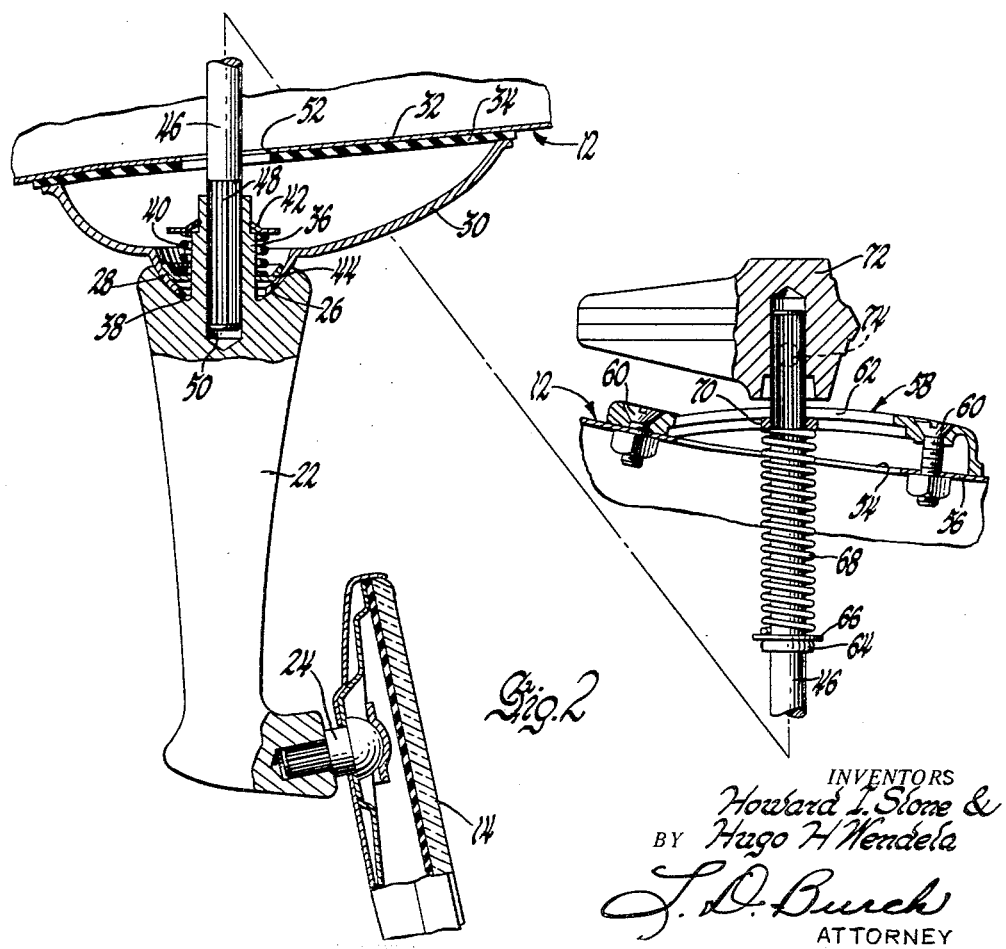

Patented May 31, 1960

2,938,697

CONTROL MEANS FOR OUTSIDE MIRRORS AND THE LIKE

Howard I. Slone, Alexandria, Ind., and Hugo H. Wendela, Detroit, Mich., assignors to General Motors Corporation, Detroit, Mich., a corporation of Delaware Filed Sept. 14, 1955, Ser. No. 534,314

5 Claims. (Cl. 248—288)

This invention relates to outside adjustable rear view mirror assemblies in general and more particularly to remote control positioning means for use with such mirror assemblies or the like.

Previous remote control positioning means adapted for use with outside adjustable rear view mirrors have included control means such as are used with automotive spotlights or simple control rods or levers, rotatable or slidable, to provide varied adjusted mirror positions. Neither of these means have proven successful principally because of the difficulty and cost of installation. A commercially acceptable outside adjustable mirror must be not only low in initial cost, but also easy to install and free of annoying rattles as finally adapted for use. Although numerous anti-rattle means are known, none have proven adaptable for use with rear view mirror control devices for reasons of added expense or increased difficulties in installing or adjusting the mirror assembly.

It is now proposed to provide an outside adjustable rear view mirror assembly which includes a minimum of parts, each of which is simple and inexpensive to manufacture, and which is easily and readily assembled together to provide a compact accessory item. It is proposed to provide a subassembly including the mirror head and base member, secured to the outer panel of a vehicle wall, which may be preadjusted prior to installation, and to include a control shaft engaging the mirror head through the base member and held in such engagement by means also adapted to bias the end of the control shaft extending through the inner panel of the vehicle wall from rattling.

The proposed outside adjustable rear view mirror control prepositioning means provide an assembly much easier and less expensive to install, reducing installation costs, and enables the use of more simple control means, which in turn reduces the initial cost of the assembly without sacrificing acceptable operation or quality appearance, thereby providing an outside mirror assembly having considerable commercial appeal.

In the drawings:

Figure 1 is a fragmentary view of a vehicle body having the proposed mirror assembly mounted thereon.

Figure 2 is a partly cross-sectioned view of the proposed rear view mirror assembly looking substantially in the plane of line 2—2 of Figure 1 and in the direction of the arrows thereon.

The proposed mirror assembly 10 is shown in Figure 1 mounted upon a vehicle wall, here being door 12, and having a mirror head 14 facing rearwardly of the vehicle. The mirror assembly is shown mounted in the vicinity of the no-draft ventilator window 16 and directly behind vehicle windshield 18. As presently disclosed in use with a wrap-around windshield, the mirror assembly is preferably mounted upon the vehicle door 12 though on some vehicles it may be mounted upon the cowl section between the vehicle hood 20 and door member, or in other locations.

The mirror assembly includes a support member or arm 22 to which the mirror head 14 is secured at the outer end thereof. The mirror head 14 may be pivotally mounted to the support arm or may be secured thereto by fastening means 24 such as are shown. The other end of the support arm 22 is formed to provide a spherical seat, joint or recess 26 near the end thereof engaging a spherical projection or ball joint 28 formed on the mirror base member 30 secured to the outer panel 32 of the vehicle door 12 by any suitable means not here shown. A gasket or sealing member 34 may be disposed between the outer door panel and the base member if desired.

The end of the mirror head support member 22 includes a necked portion 36 extending outwardly from the spherical recess 26 and through an enlarged aperture 38 provided in the projection 28 formed on the mirror base 30. Spring means 40 disposed about the necked portion 36 of the support arm and engaging a speed nut 42 provided thereon, is adapted to bias a spring washer 44 in engagement with the inner surface of the base member ball joint projection 28. This biasing action in turn frictionally engages the spherical recess 26 of the support arm to the ball joint projection 28 of the base member.

The base member 30 and support arm 22, including the mirror head 14, may be pre-assembled thereby eliminating a major factor of difficulty otherwise experienced in installing an outside adjustable rear view mirror.

A control rod or shaft 46 having an end splined as at 48 is received within a complementary splined hole 50 provided in the necked portion 36 of the mirror head support arm 22. The control rod 46 extends through an oversize opening 52 in the outer panel 32 of the vehicle door and through an elongated opening 54 provided in the inner wall panel 56 of such door member. A guide plate 58 is secured to the outer surface of the inner door panel 56 as by fastening means 60 shown and includes an elongated slot 62 receiving the other end of the control rod 46 therethrough. The control rod 46 is provided with a shoulder portion 64 and has a washer 66 disposed thereon receiving a coil spring member 68 which engages a bushing 70 disposed near the end of the control rod within the guide plate 58. A control knob 72 is secured to the end of the rod within the vehicle compartment as by set screw means 74, shown in dotted lines.

Installation of the proposed mirror assembly requires providing aligned openings 52 and 54 through outer and inner panels 32 and 56, respectively, securing the pre-assembled and adjusted mirror head 14, support arm 22 and base member 30 to the outer door panel, with the control rod 46 preferably first spline connected to the necked portion 36 of the support arm, disposing the washer 66, spring member 68 and bushing 70 on the control rod, securing the guide plate 58 to the inner door panel, with the end of the control rod extending through guide slot 62, and fixing the control knob 72 to the end of the remote control mirror positioning rod 46. No further adjustment is required and the assembly thus installed has the control rod biased both in operative engagement with the mirror head supporting arm 22 and in rattle-free disposition with respect to the guide plate 58.

Adjustment of the mirror head 14 in a horizontal plane is accomplished by moving the control rod 46 fore and aft within the limits of the elongated slot 62 formed within the guide plate 58. Horizontal adjustment of the mirror head 14 is accomplished by rotating the control rod 46 by means of the control knob 72. By a combination of adjustments the mirror head may be remotely positioned from the inside of the vehicle to satisfy the user thereof.

We claim:

1. A rear view mirror assembly comprising a mirror supporting arm member and a supporting base member adjustably secured together and adapted to be secured to a vehicle wall, a recess formed within said base member adjacent said vehicle wall and said arm member, said arm and base members having a spherical ball portion formed on the one and a spherical socket portion formed on the other, said ball and socket portions including an extension formed from the one and an opening for receiving said extension formed within the other, said extension being received and terminating within said recess, means disposed upon said extension within said recess and engaged with said extension and with said base member for biasing said ball and socket portions in frictional engagement, and separate remote control means engaged with said extension and extendable through said vehicle wall for remotely positioning said mirror supporting arm member relative to said supporting base.

2. The rear view mirror assembly of claim 1 wherein said biasing means includes a coil spring disposed about said extension, stop means secured to said extension near the end thereof and preventing inward movement of said spring, and a spring receiving washer member interposed between said spring and said supporting member.

3. The rear view mirror assembly of claim 1 including a guide plate for attachment to the inner panel of said vehicle wall and having an elongated slot formed therein for receiving said remote control means therethrough, a washer disposed about said remote control means, and resilient means compressed between said remote control means and said washer for biasing said washer in frictional engagement with said guide plate and the end of said remote control means in rattle-free disposition relative thereto.

4. A remote control rear view mirror assembly comprising a mirror supporting arm member and a hollow supporting base member adjustably secured together and adapted to be secured to a vehicle wall, said base member being formed to provide a ball portion having a convex external surface and a concave internal surface, said arm member having a socket portion formed integral therewith and near the end thereof, a stub end extension of said arm extending beyond said socket portion, said ball portion having an opening formed therein for receiving said stub extension therethrough, means received upon said extension and engaging said concave internal surface of said ball portion for biasing said socket portion in shielding relation over and in frictional engagement with said ball portion, and a control rod engageable with said stub extension and extendable through said vehicle wall for the control of the relative relation of said arm and base members at a remote location apart therefrom.

5. The remote control rear view mirror assembly of claim 4 including a guide plate for attachment to the inner panel of said vehicle wall, an elongated slot formed within said guide plate for receiving said control rod therethrough, a close fitting washer disposed on said control rod and adjacent said guide plate, a shoulder formed about said control rod intermediate said stub extension and said guide plate, and a coil spring disposed about said control rod and compressed between said shoulder and said washer for biasing the end of said control rod in rattle-free disposition relative to said guide plate.

References Cited in the file of this patent

UNITED STATES PATENTS

| | | |
|---|---|---|
| 1,446,164 | D'Eyraud | Feb. 20, 1923 |
| 2,533,475 | Koonter | Dec. 12, 1950 |
| 2,733,886 | Haberstump | Feb. 7, 1956 |
| 2,746,355 | Wells | May 22, 1956 |
| 2,746,356 | Wells | May 22, 1956 |